May 2, 1933. E. A. ROCKWELL 1,907,009
COMBINED ACCELERATOR AND BRAKE CONTROL
Filed April 23, 1932
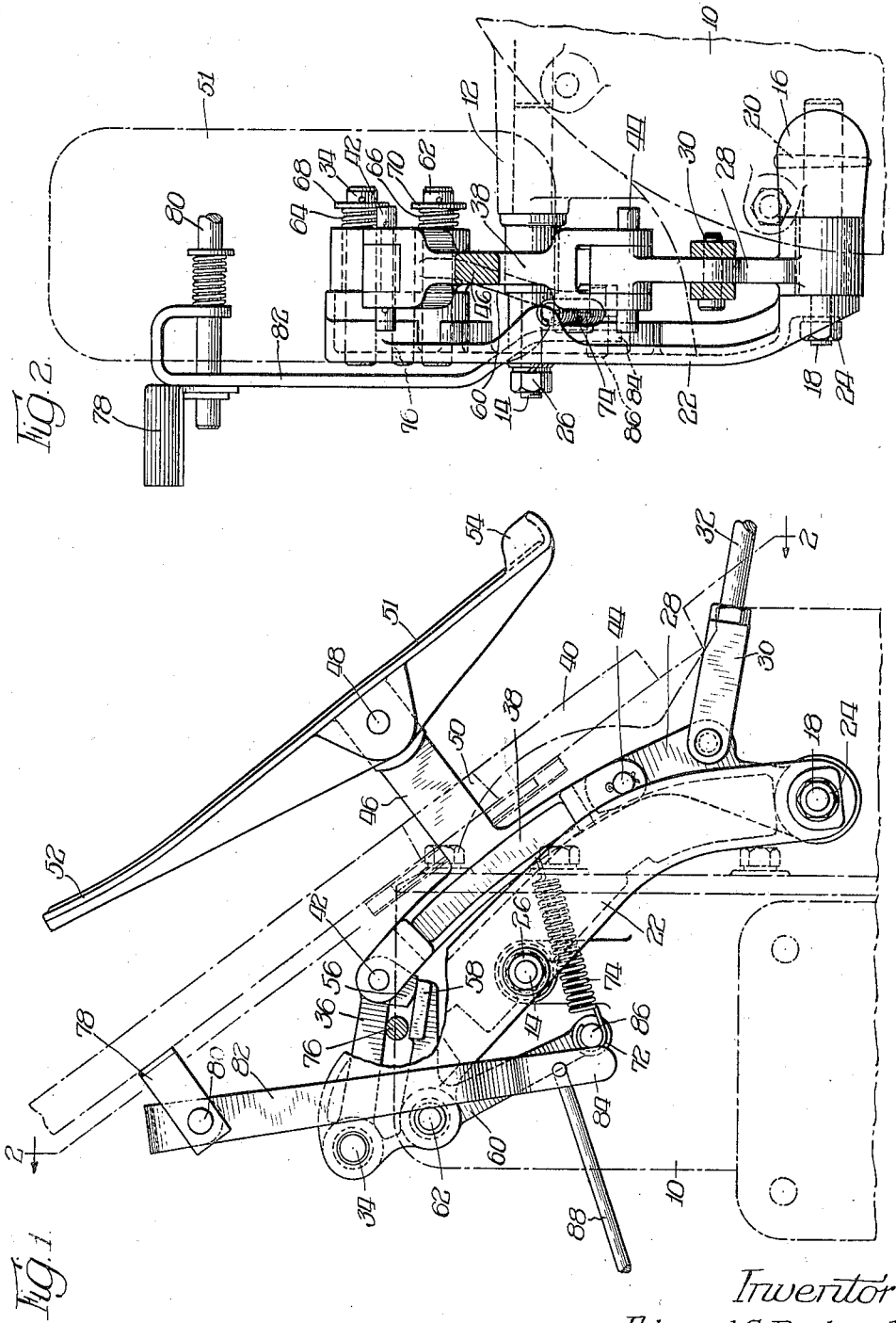
Inventor:
Edward A. Rockwell, Patented May 2, 1933

1,907,009

UNITED STATES PATENT OFFICE

EDWARD A. ROCKWELL, OF CHICAGO, ILLINOIS

COMBINED ACCELERATOR AND BRAKE CONTROL

Application filed April 23, 1932. Serial No. 607,037.

This invention relates to a combined accelerator and brake control and more particularly to a construction in which a single pedal is so mounted that it may be selectively rocked in either direction by the operator to apply at will the accelerator or the brake, or may be used to operate any two controls of a motor vehicle.

The present invention is an improvement over the dual control pedal described and claimed in my application, Serial No. 224,847, filed October 8, 1927.

It is an object of the present invention to so control the support for the pedal that only a single extension protrudes through the floor board.

It is a further object to provide an improved mounting for the pedal which is adapted for support rigidly on the engine frame beneath the floor board and which may be readily adapted to operate the throttle and the braking mechanism or other controls.

In the drawing:

Figure 1 is a side elevation of the improved dual control pedal, and

Figure 2 is a view looking downward upon the mechanism beneath the floor board, the pedal extension being shown in section.

In the drawing 10 is a portion of the engine frame having a boss 12 for the support of a fixed pin 14. At a point beneath the pin 14 and somewhat rearwardly of the vehicle is a second boss 16 on the engine frame serving as a support for a pin 18 held against displacement by a pin 20. The pins 14 and 18 serve as fixed supporting points for a fulcrum plate 22, which is held at its lower end against a shoulder of the pin 18 by a nut 24 and is similarly held against the shoulder of the pin 14 by nut 26.

Rotatably supported on the pin 18 between the fulcrum plate 22 and the boss 16 is a lever arm 28 to which may be secured, by pin 30, a brake actuating pull rod 32 or other control. At its upper end the fulcrum plate 22 carries a pin 34 for rotatably mounting a lever arm 36. A substantially T-shaped pedal support 38 is rockably supported by the lever arms 28 and 36 since it will be noted that the head of the T-shaped member, which is beneath the floor board 40, is pivotally connected at 42 with lever 36 and pivotally connected at 44 with lever 28. The arm 46 of the T-shaped member, which protrudes through an opening 50 of the floor board, has a substantially square-shaped end to which is secured, by pin 48, a pedal 51 having a toe portion 52 and a heel portion 54.

It will be noted that the lever arm 28, T-shaped member 38 and lever arm 36 form a three-bar linkage and that in the normal position shown in Figure 1, pressure upon the toe 52 of the pedal 51 will tend to depress the pivot point 42 whereby lever 36 will rotate in a clockwise direction about pivot 34, while lever 28 will also rotate in a clockwise direction about pivot 18. On the other hand if pressure is applied to the heel 54, the pedal 51, the lever arms 36 and 28 will turn in opposite directions.

The lever arm 36 has a lug 56 in thrust engagement with an arm 58 of a bell crank lever 60, which is supported by pivot pin 62 carried by the fulcrum plate 42 adjacent the pivot pin 34. The pivot pins 34 and 62 carry springs 64 and 66. The spring 64 is positioned between a washer 68 and the hub of lever arm 36 while the spring 66 is similarly positioned between the washer 70 and the hub of bell crank lever 60. The bell crank lever 60 has a lever arm 72 connected by a tension spring 74 to a fixed point on the fulcrum plate 22, whereby the linkage is held in normal released position through the lever arm 58 abutting a fixed pin 76.

Secured to the bottom side of the floor board is a support 78 carrying a rod 80 which rockably supports a lever 82, the lower portion 84 of which is inwardly bent to be engaged by the pin 86 carried by the lever arm 72 to which the spring 74 is secured.

It will be evident that pressure upon the toe of the pedal will move lever arm 36 and will transmit movement to the bell crank lever 60 in a direction to extend the spring 74 and to transmit movement to the lever arm 82, which in turn, through the pull rod 88, will transmit movement to a throttle or other control of the motor vehicle. Rocking the pedal in the opposite direction by pressing on the heel of the pedal will serve to actuate the brake control.

Various changes and modifications may be resorted to in specific designs without departing from the spirit of my invention as expressed in the appended claims.

I claim:

1. Combined control mechanism for motor vehicles, comprising a pair of fixed pivots, levers carried by each of said fixed pivots, a link pivotally connecting said levers out of alignment with the fixed pivots forming a three-bar linkage, said link having an extension therefrom forming a pedal support, a rockable pedal carried by said extension, linkage connections moved by one of said levers for operating one control, linkage connections moved by the other of said levers for actuating the other control, said pedal being operated to selectively actuate either of said controls.

2. Combined control mechanism for motor vehicles comprising a pair of spaced fixed pivots, levers pivoted respectively to each of said fixed pivots, a link pivotally connecting said levers out of alignment with the fixed pivots forming a three-bar linkage, whereby the rotation of one of said levers in an actuating direction rotates the other lever in a direction opposite to its actuating direction of movement, said link having a single pedal supporting extension therefrom, a rockable pedal carried by said extension for selectively moving either of said levers in an actuating direction, linkage connections operative by movement of one of said levers for actuating one control and linkage connections operative by movement of the other of said levers for actuating the second control.

3. Combined control mechanism for motor vehicles including a floor board and an engine frame beneath the floor board, a pair of pivots fixed with respect to the engine frame beneath the floor board, a lever pivotally carried by one of said pivots for actuating one control, a lever pivotally carried by the other of said pivots for actuating a second control, a link pivotally connecting said levers out of alignment with the fixed pivots forming a three-bar linkage together with said levers, said link having a single extension through the floor board and a rockable pedal carried by said extension above the floor board whereby pressure upon the toe of said pedal will operate one of said controls and pressure upon the heel of the pedal will operate the other of said controls.

4. Combined control mechanism for motor vehicles comprising a fixedly supported fulcrum plate having a pair of spaced pivots, a lever pivotally supported by said fulcrum plate at each of said pivots, a link pivotally connecting said levers out of alignment with said pivots, a pedal carried by said link for operating one of said levers upon movement in one direction and for operating the other of said levers upon movement in the opposite direction and separate controls of the vehicle, each of which is actuated by one of said levers.

5. Combined control mechanism for motor vehicles including a floor board and an engine frame beneath the floor board, a pair of spaced pivots rigid with respect to the fulcrum plate, a pair of levers, one of said levers being carried by each of said pivots, a link pivotally connecting said levers, said link having an extension through the floor board, a rockable pedal carried by said extension above said floor board and separate vehicle controls operatively connected with said levers whereby movement of said pedal in one direction will actuate one of said controls and movement of the pedal in the opposite direction will actuate the other of said controls.

Signed at Chicago, Illinois, this 20th day of April, 1932.

EDWARD A. ROCKWELL.